(12) United States Patent
Van Cutsem et al.

(10) Patent No.: US 10,026,069 B2
(45) Date of Patent: Jul. 17, 2018

(54) SYSTEM AND METHOD FOR SOFTWARE APPLICATION USAGE METERING USING DATA STORE

(71) Applicant: Actian Corporation, Redwood City, CA (US)

(72) Inventors: Gilbert Van Cutsem, Austin, TX (US); Woan-Yoke Lau, Austin, TX (US); Jeff Chapman, Cedar Park, TX (US); Tom Bates, Austin, TX (US); Jan Daley, Austin, TX (US)

(73) Assignee: Actian Corporation, Redwood City, CA (US)

( * ) Notice: Subject to any disclaimer, the term of this patent is extended or adjusted under 35 U.S.C. 154(b) by 655 days.

(21) Appl. No.: 14/136,508

(22) Filed: Dec. 20, 2013

(65) Prior Publication Data

US 2015/0032415 A1    Jan. 29, 2015

Related U.S. Application Data

(60) Provisional application No. 61/745,869, filed on Dec. 26, 2012.

(51) Int. Cl.
| | | |
|---|---|---|
| *G06F 9/46* | (2006.01) |
| *G06Q 20/14* | (2012.01) |
| *G06F 8/77* | (2018.01) |
| *G06F 11/30* | (2006.01) |
| *G06F 11/34* | (2006.01) |

(52) U.S. Cl.
CPC ............. *G06Q 20/145* (2013.01); *G06F 8/77* (2013.01); *G06F 11/3034* (2013.01); *G06F 11/3003* (2013.01); *G06F 11/3485* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 5,751,338 A * | 5/1998 | Ludwig, Jr. ......... | H04L 12/2859 345/2.2 |
| 6,832,250 B1 | 12/2004 | Coons et al. | |
| 8,924,361 B2 * | 12/2014 | Rehman ................ | G06F 3/048 707/688 |
| 2011/0283045 A1 | 11/2011 | Krishnan et al. | |
| 2012/0089610 A1 | 4/2012 | Agrawal et al. | |

* cited by examiner

*Primary Examiner* — Craig C Dorais
(74) *Attorney, Agent, or Firm* — Egan Peterman Enders Huston

(57) ABSTRACT

A system and method for usage metering software applications (or features or functions) by monitoring the data store underlying the software application. The data store function may be implemented in many ways, such as a Relational Database, Transactional Database, Network and Graph Database, Object-Oriented Database, Embedded Database, In-memory Database, Schema-less Database, Files and Directories, whether structured or unstructured, Configuration Registries, or Non-traditional Repositories. Business activities performed by the software application are tracked and are independent of hardware usage. Such usage data is valuable in a variety of contexts, including billing based on business activity.

22 Claims, 20 Drawing Sheets

FIG 9A
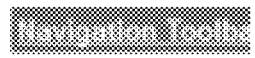
Date: 06/20/2012
Time: Wed, 20 Jun
19:13:39 +0100 360
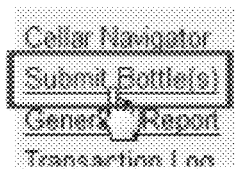
FIG 9B
```
Define Business Activity
    Description: *    Wine Listing Fee
    Active: ?         • Yes   ○ No
Set Pricing
    Set the price to: 1.00
Map Database Event to Business Activity
    Database Event: Insert
    Include
        Database: equals   phpwine          Table: equals   bottle
```

Bottle Submission

Your submission request has been completed successfully

| ▽ Subscriber Name | ⇅ Metering Profile Name | ⇅ Statement Balance | |
|---|---|---|---|
| Pervasive Vineyards | Wine Merchant | $1.00 | |

Usage Charges

| Activity | Price Per Unit | Units Used | Amount |
|---|---|---|---|
| Wine Listing Fee | $1.00 | 1 | $1.00 |

TOTAL CHARGES FOR THIS STATEMENT : $1.00

FIG 10C
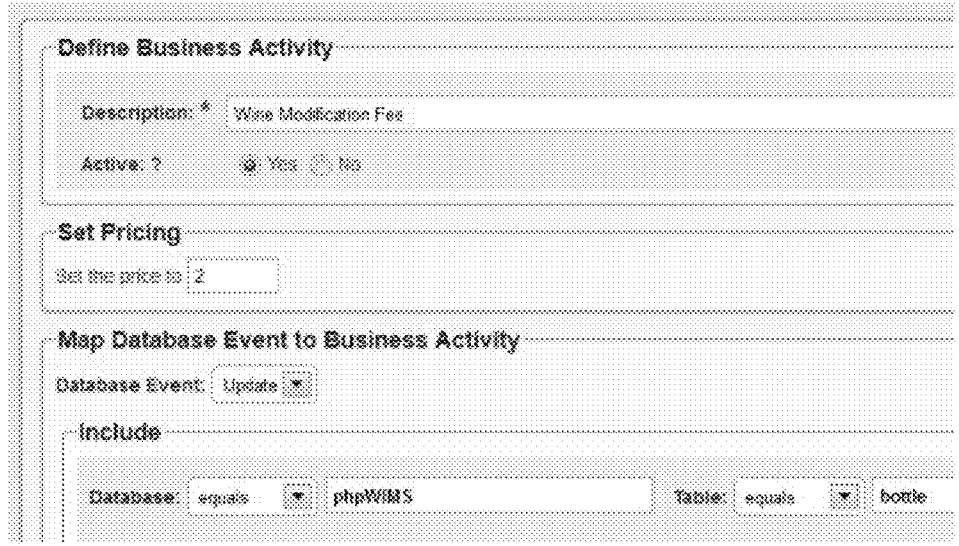
FIG 10D
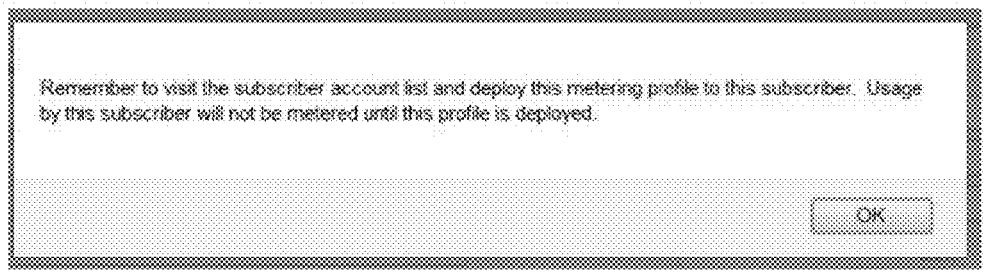
FIG 10E

Your submission request has been completed successfully

| 2008 | Campagiovanni (San Felice) | n/a | Sangiovese | Brunello di Montalcino | 1 | View |
| 2008 | La Serena | n/a | Sangiovese | Brunello di Montalcino | 1 | View |
| 2008 | Dehlinger | Penascus Vineyards | Pinot Noir | Russian River Valley | 2 | View |
| 2008 | Hall | n/a | Cabernet Sauvignon | Napa Valley | 1 | View |
| 2008 | Rusack | n/a | Syrah | Santa Barbara County | 1 | View |
| 2008 | Huët | Clos du Bourg | Chenin Blanc | Vouvray | 1 | View |
| 2009 | Kosta Browne | n/a | Pinot Noir | Sonoma Coast | 1 | View |
| 2009 | Owen Roe | n/a | Syrah | Columbia Valley | 1 | View |
| 2009 | Merry Edwards | n/a | Sauvignon Blanc | Russian River Valley | 1 | View |
| 2010 | Cloudy Bay | n/a | Sauvignon Blanc | Marlborough | 1 | View |

FIG 15D

[Submit Changes] [Reset Form] [Delete Record] [Checkout] 1

[Export Description] [Printable Description] [Add To Shopping List]

Your query was successful and there is/are currently 1 item(s) in your shopping list.

FIG 16

Usage Charges

| Activity | Price Per Unit | Units Used | Amount |
|---|---|---|---|
| Wine Shopping List Fee | $3.00 | 1 | $3.00 |

TOTAL CHARGES FOR THIS STATEMENT: $3.00

SYSTEM AND METHOD FOR SOFTWARE APPLICATION USAGE METERING USING DATA STORE

BACKGROUND OF THE INVENTION

1. Field of the Invention

The invention relates to a system and method for metering usage of a software application, feature or function by metering data usage in the data source for the application, feature or function.

2. Description of the Related Art

There is no method available to measure usage of software applications, features or functions, based on actions performed by the users of the application, feature or function.

Available usage-based billing and metering methods only consider hardware usage or have a fixed price subscription for software use during a specific period of time, without the ability to distinguish different usage scenarios or which applications, features or functions were actually used.

Those skilled in the art are aware that there are methods for measuring and reporting hardware consumption, e.g. amount of memory used, CPU execution time, uptime duration for the hardware and the resources reserved for physical or virtual environments. But hardware consumption or time-based usage is not an accurate measure to reflect actual business operations performed when each software application, feature or function is used.

Those skilled in the art are aware that hardware details are hidden from users of software application and features (rightfully so) and yet the usage of the applications, features or functions is reported based on hardware usage. They are also aware that with capacity-based, time-based, feature-based or pre-pay models, fees are charged based on the availability of the applications, features or functions for use during a specific period of time. These models lack the ability to measure and charge for actual usage of individual applications, features or functions.

SUMMARY OF INVENTION

The present invention broadly relates to a system and a method for metering usage of a software application, feature or function by metering data usage in the data source for the application, feature or function.

The application, feature or function's underlying data store may be implemented as a traditional database, an in-memory database, in the operating system's registry, in a company calendar, in a specific contact list, in plain text files, in spread sheets, in binary data files or any other data repository that is obvious to those skilled in the art.

Logical business metrics depicting the usage by the application, feature or function, are associated with data store activities generated by that usage pattern. Data store operation patterns associated with any individual application, function or feature can be metered individually or collectively. Additionally, data operation patterns associated with any application, function or feature used by specific users, or specific groups of users, can also be metered individually or collectively. Every business activity performed using the software application, feature or function that generates data store operations can be configured for metering. The raw usage data collected describes the data store operations resulting from the detailed execution of each metered aspect of the application, feature or function.

Metering application, feature or function usage at the data store level provides detailed and accurate usage data for every metered application, feature or function as it is used and is completely independent of the hardware usage associated with these activities.

An application, feature or function may have multiple metering profiles representing different customer profiles or usage scenarios. For example, metering profiles may be offered for different service levels, like platinum, gold or silver, or may be offered for different customer types, like non-profit, small-business or enterprise customers.

The metering profile describing which data store operations to meter along with their associated business activities, as well as the metering component that captures the data store activities, may be installed and utilized on the machine where the data store resides. It may also be installed and utilized on other local systems, on remote systems, in a cloud environment or any combination that are obvious to those skilled in the art.

When business operations are performed in the software application, feature or function that matches the metering criteria defined by the metering profile, then the business activities which are mapped to the metering criteria will be included in the metered business activity usage data. Every business activity results in a data store operation is able to be accurately metered by this invention. The metered data store operation data and/or business activity usage data may be encrypted and protected from tampering that are obvious to those skilled in the art. The usage data may also be aggregated over a period of time.

In one aspect, the invention hereof generates usage data by monitoring how an unchanged software application interacts with its external data stores.

Note that the system and method of the present invention can be extended beyond a billing application. In a broad sense, the system and method of the present invention simply generates usage data. Pricing and billing is just one of the many things you might do with this usage data. So when you see references to pricing and billing below, this is only provided to help fully visualize the value of this invention.

BRIEF DESCRIPTION OF THE DRAWINGS

FIGS. 9A-9F relate to a Quick Start demonstration, where FIG. 9A is a control icon, FIG. 9B is a business activity form, FIG. 9C is another control icon, FIG. 9D is a confirmation message, FIG. 9E is a view of the current statement, and FIG. 9F is another user statement.

FIGS. 10A-10E illustrate another business activity example, where FIG. 10A is a profile form, FIG. 10B is an editor form, FIG. 10C is a summary statement, FIG. 10D is a notification, and FIG. 10E is a selection icon page.

Figures 11E, 11F, 12A, 12B:
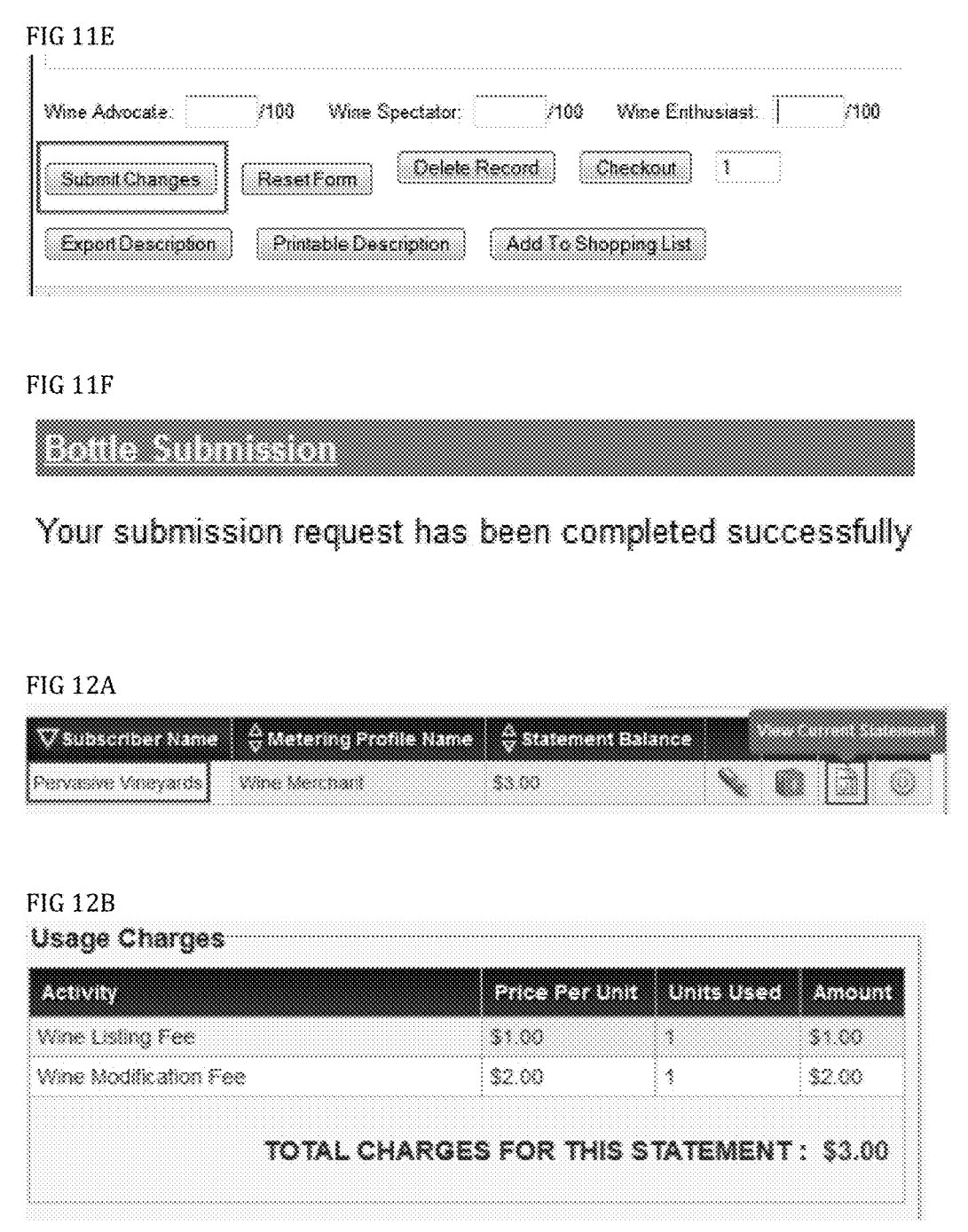

FIGS. 11A-11F relate to the demonstration of FIG. 10, but with roles switched to the subscriber, where FIG. 11A is a control icon, FIG. 11B is a selection form, FIG. 11C is another selection form, FIG. 11D is another form, FIG. 11E is a form with a selection icon, and FIG. 11F is a notification.

FIGS. 12A-12B show the ISV role for the statement in FIG. 11, where FIG. 12A is a selection form, and FIG. 12B is statement.

FIG. 13A is a control icon, FIG. 13B is selection form, FIG. 13C is statement, and FIG. 13D is a selection icon.

FIG. 14A is a subscriber account form, FIG. 14B is a notification, and FIG. 14C is a selection icon.

FIGS. 15A-15D create the shopping list for the business activity of FIG. 14, where FIG. 15A is a selection icon, FIG. 15B is a selection form, FIG. 15C is another selection form, and FIG. 15D is a selection form.

FIG. 16 illustrates a statement for the wholesale subscriber.

DETAILED DESCRIPTION OF THE INVENTION

It is to be understood that, in certain embodiments, the present invention meters the usage of a software application, feature or function based on tracking changes to the data store underlying the software application, feature or function. The systems and methods of the present invention can be applied to any software application or feature that makes changes to data persisted in any kind of repository where change monitoring is possible, regardless of how that data is stored, collected or transported. The software application, feature or function to be monitored does not require, but also does not preclude, any architecture, algorithm or code modifications to the software application, feature or function in order for them to be metered with this invention.

First Embodiment (Generalized Architecture)

Figure 1:
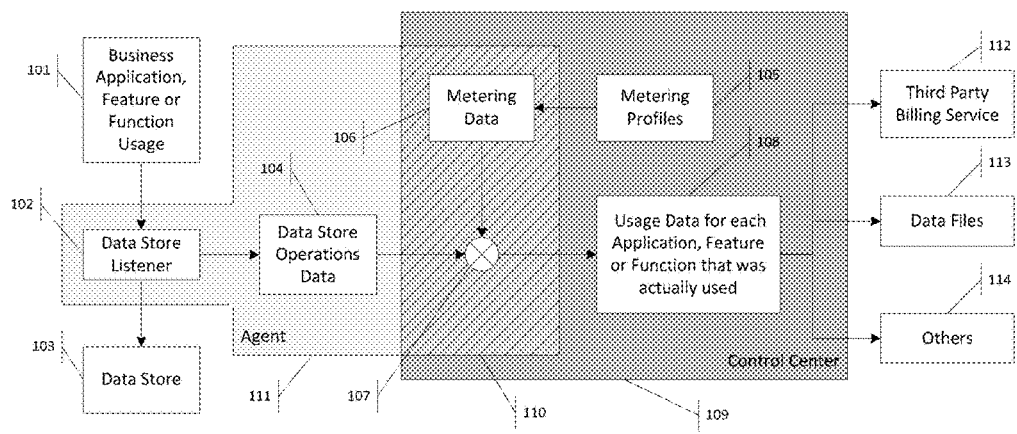
FIG. 1 is a schematic diagram of the system and segments of a flow chart used in some embodiments of the present invention.
Figure 2:
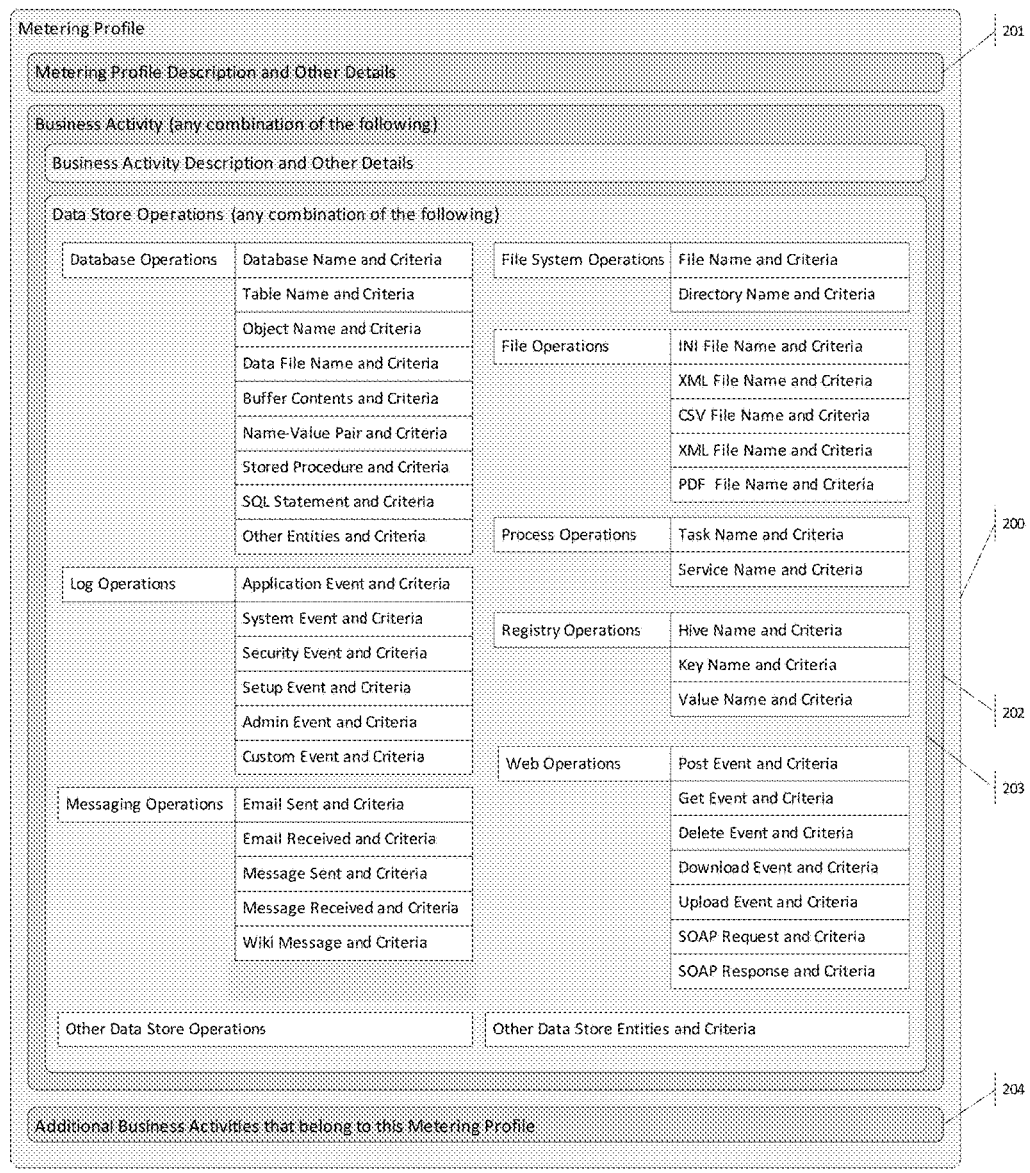
FIG. 2 is diagram showing an example of one possible implementation of a metering profile form that maps business activities to data store events.

With reference to FIGS. 1 and 2, this embodiment describes a general architecture of this invention.

This generalized embodiment has a control center (109) and one to many local or remote agents (111). A standalone configuration may have the agent (111) integrated within the control center (109).

The software application vendor decides which business activities they desire to meter and generates metering profiles (105) for the intended application, feature or function (101). Different metering profiles (105) may exist for the same application, feature or function (101) to reflect different pricing and billing models (e.g., with different rates for gold, silver, bronze, wholesale and non-profit customers) or to capture usage patterns for analytics.

Using the control center (109), a metering profile (105) is created which associates data store operations data (104) directly to the business activities (101). This data may also track specific users, groups and/or specific user and group usage scenarios. The metering profile (105) is composed of, but not limited to, profile details (201) about the application, feature or function as well as other properties like billing cycle and status (201). It is also composed of one or more business activity definitions (202 and 204) which describe the data store operations (203) associated with each business activity.

Each business activity may contain one or more data store operation definitions (203) where each may include data such as, but not limited to, one or more data store names and matching criteria, one or more table names and matching criteria, one or more stored procedure names and criteria, one or more SQL statements and matching criteria as well as any other data store operations or capabilities offered by the application, feature or function's underlying data store.

These data stores may also include any collection of information including, but not limited to, the file system, the registry, the web server, the email server, system event logs and other data stores obvious to those skilled in the art.

The profile details, business activity details and the associated data store operation definitions are referred to as a metering profile (200). For a given application, feature or function (101) to be metered, there may be one to many metering profiles (105) which may contain one to many business activity definitions (202) which may contain one to many data store operation definitions (203). The metering profiles (105 and 200) generate metering data (106) suitable for the next steps.

As the application, feature or function (101) is used, the data store operation definitions (102) are detected by the agent (111). Data store operation definitions (102) correspond to the business activities (101) that changed the application's underlying data store (103).

For example, a particular business activity does two operations to the underlying data stores when it processes an invoice: It inserts a record into a specific table of a certain database and it adds an attribute into a specific element of a certain XML element in a well-known XML file. When both of these two events are detected by the agent, it adds one business activity record to the usage data.

Key details of these operations (102) are gathered and/or filtered into data store operations data (104). Data store operations data (104) is generated as the tracked changes are being written, or anytime later, to the underlying data store (103). The data store operation data (104) is cross-referenced and matched (107) against the metering data (106) to produce application, feature or function usage data (108). This processing may be performed at the agent (111), at the control center (109) or both.

The generated application, feature or function usage data (108) can be sent to various destinations such as third party services (112), data files (113) or other repositories (114) obvious to those skilled in the art.

This generalized embodiment may be implemented on one to many machines. When multiple machines are used, standard interfaces and protocols allow them to securely communicate with each other.

Second Embodiment (Architecture where Data Store Activity is Captured Internal to the Data Store)

Figure 3:
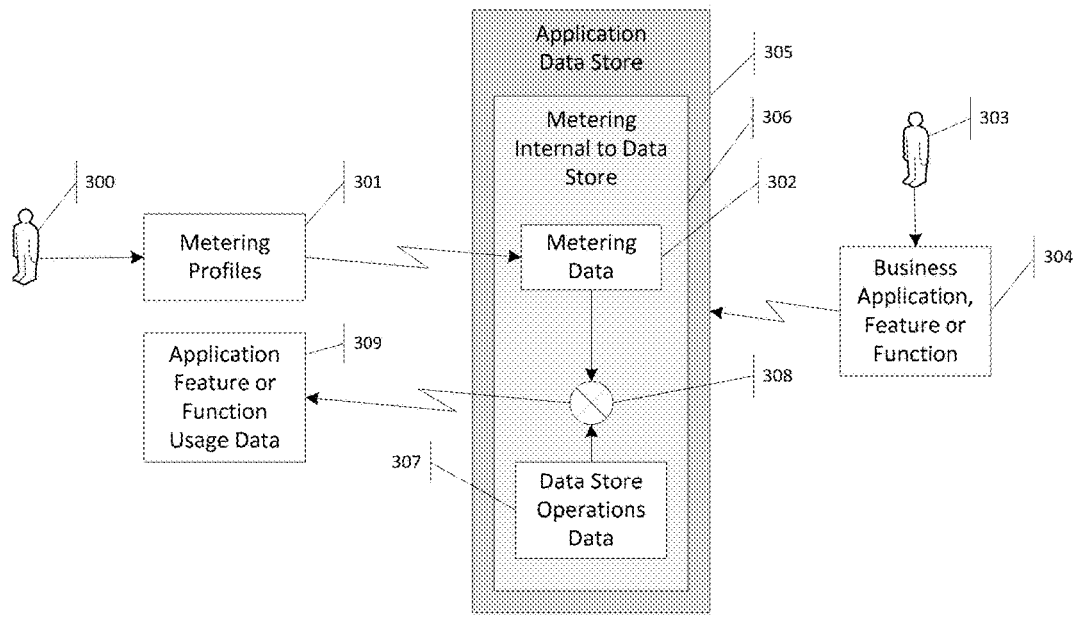
FIG. 3 is a block diagram of one possible implementation where the data store is monitored internal to the data store to capture data store activities.

With reference to FIGS. 2 and 3, this embodiment describes an implementation of the first embodiment where the data store operations data (307) is captured and processed internally within the underlying data store (305) for the application, feature or function (304).

An actor (300) decides which business activities they desire to meter and generates metering profiles (200 and 301) for the intended application, feature or function (304). Different metering profiles (200 and 301) may exist for the same application, feature or function (304) to reflect different pricing and billing models (e.g., with different rates for gold, silver, bronze and non-profit customers) or to capture usage patterns for analytics.

The metering data (302) is provided to the metering mechanism internal to the data store (306). As the business application, feature or function (304) is used, the internal metering mechanism (306) captures the data store operations data (307). The data store operations data (307) is cross-referenced and matched (308) against the metering data (302) to produce the application, feature or function usage data (309).

Third Embodiment (Architecture where Data Store Activity is Captured External to the Data Store)

Figure 4:
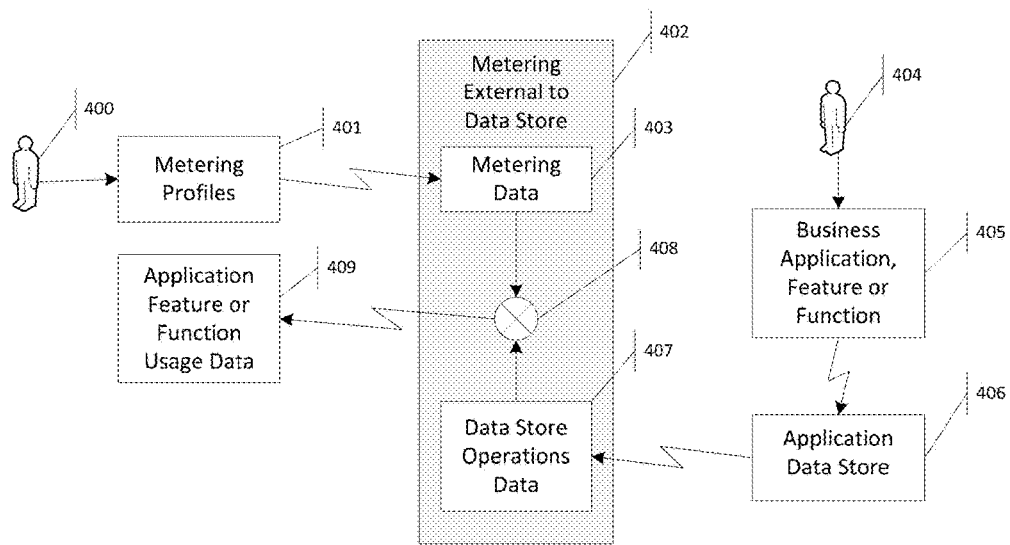
FIG. 4 is a block diagram of one possible implementation where the data store is monitored external to the data store to capture data store activities.

With reference to FIGS. 2 and 4, this embodiment describes an implementation of the first embodiment where the data store operations data (407) is being captured and processed externally to the underlying data store (406) for the application, feature or function (405).

An actor (400) decides which business activities they desire to meter and creates metering profiles (401) for the intended application, feature or function (405). Different metering profiles (200 and 401) may exist for the same application, feature or function (405) to reflect different pricing and billing models (e.g., with different rates for gold, silver, bronze and non-profit customers) or to capture usage patterns for analytics.

The metering profiles (200 and 401) are sent to the external metering mechanism (402) as metering data (403). As the business application, feature or function (405) is used, the external monitoring mechanism (402) captures all data store activities (406) into the data store operations data (407). The external metering mechanism (402) generates the data store operations data (407). The data store operations data (407) is cross-referenced and matched (408) against the metering data (403) to produce the application, feature or function usage data (409).

INDUSTRIAL APPLICABILITY

The aforementioned may be implemented as dedicated electronic hardware (such as a dedicated appliance that routes traffic between the application or feature and the underlying data store) or by means of more generalized digital computation devices (such as the plugins, triggers or agents mentioned above).

The above only describes only some of the embodiments of the present invention and modifications. This patent also covers other architectural variations and modifications, obvious to those skilled in the art, which can be made thereto without departing from the scope and spirit of the present invention.

General Example

Figure 8:
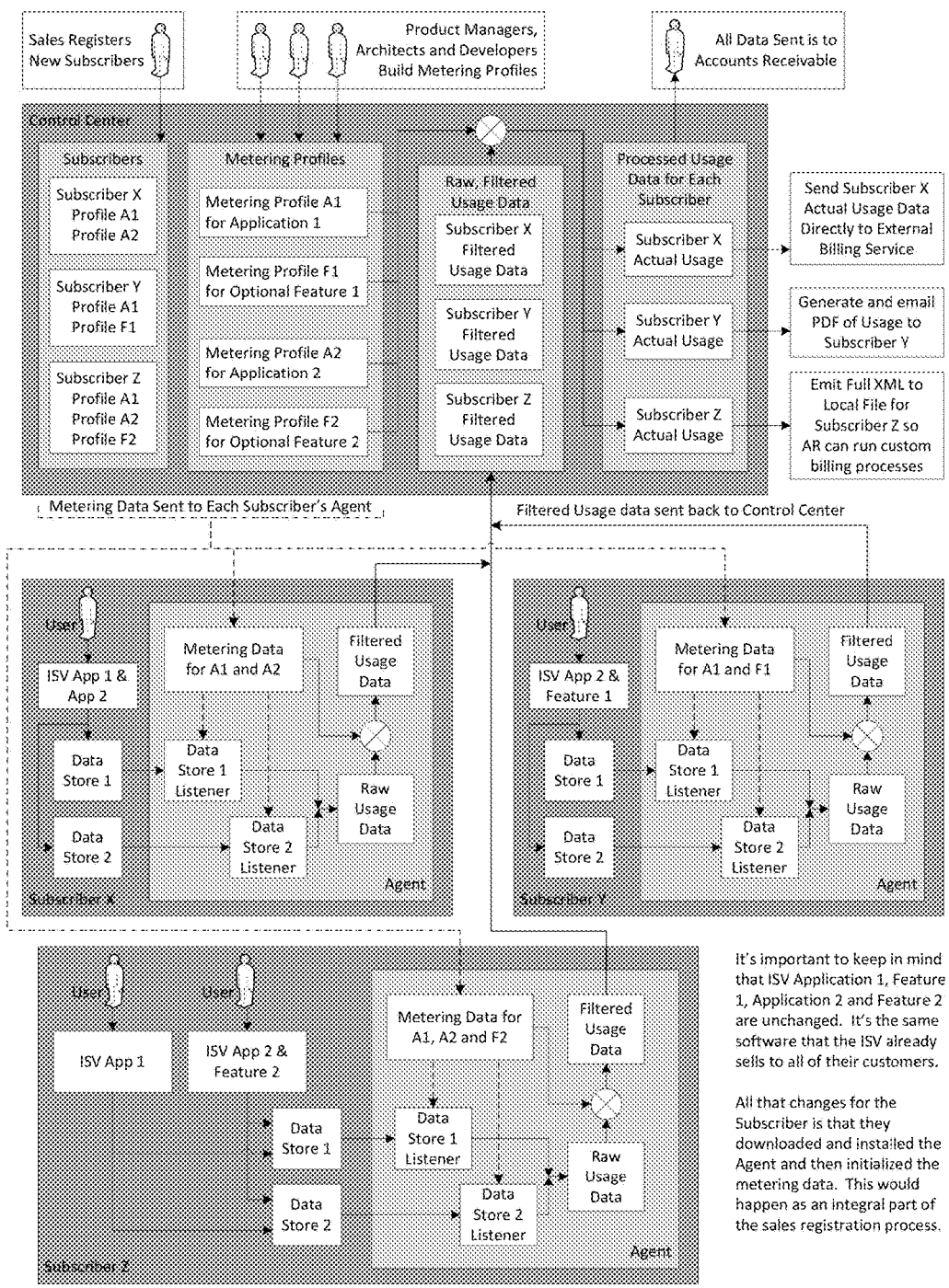
FIG. 8 is a block diagram showing an ISV selling two applications.

This diagram of FIG. 8 has one ISV who sells two applications:
  Application A1 has optional feature F1
  Application A2 has optional feature F2
The subscribers may be hosting the software applications locally (e.g., in a local collection of virtual or real machines), at a nearby hosting site (e.g., Rackspace) or in a cloud (e.g., Amazon). The subscribers may also be employees using commercial software for which IT wants to 'chargeback' the costs to each department according to their usage. Regardless of the deployment, the components and processes remain the same.

Although only three subscribers and four metering profiles are shown in the diagram, the system can easily scale horizontally.

The three subscribers shown in FIG. 8 are as follows:
  Subscriber X is using applications A1 and A2, but with no optional features. This subscriber is billed through their account with Aria Systems.
  Subscriber Y is using application A1 with optional feature F1. This subscriber is billed directly by sending a PDF attached to an email.
  Subscriber Z is using application A1 with no optional features and application A2 with optional feature F2. This customer gets special handling. Their usage data is emitted as XML so it can be processed by a separate script provided by the ISV.

Both applications use the same data stores: a relational database and the file system.

Once the control center is setup, the ISV product manager decides which business activities to charge for. The ISV architects and developers determine what changes, and to which underlying data stores, constitute proof that each business activity was performed. Once the metering profiles are active, the ISV sales staff can begin registering subscribers.

When the subscriber is being setup by the ISV sales person, the subscriber will download and install the agent on the machines(s) with the data store(s). The agent is initialized by downloading the metering data for the metering profiles that this customer is subscribing to.

At this point, the subscriber installs and configures the ISV software application. This is the same software application, unchanged, that the ISV has been selling for years. The subscriber uses the application just like any other customer.

The main difference is that the subscriber does not purchase the product up-front and they will only be charged for the business activities actually performed. This may be repeated for any number of subscribers, metering profiles and software applications.

As the subscriber uses the software application, the agent listeners notice the associated data store operations. The metering data is applied to the incoming raw data store operations data to filter out changes which do not meet the criteria in the metering profiles. Incoming data store operations which satisfy all of the criteria for a business activity will cause another business activity usage record to be added to the filtered usage data.

On a regular basis, the filtered usage data is sent back to the control center. This may be manual, invoked by a timer or triggered by other events (like whenever a user exits the metered software application.) The transfer of this filtered usage data may be 'pulled' by the control center or it may be 'pushed' by the agent.

The control center uses the rest of the metering profile and metering data to further process the filtered usage data. For example, it may reorganize the data according to the software application product, the metering profile, the subscriber class and then by business activity.

The result of this processing is the actual business activity usage data for a given subscriber or for a given application. This 'actual business activity usage data' can be sent directly to the accounts receivable team so they can calculate expected revenues. It may be converted into a PDF that can be emailed to the subscriber. It may be emitted as an XML or other flat text/data file for custom processing. And it may be sent directly to the web service APIs of an external billing service like Aria or Zuora.

Library Example

This example relates to a software application that is designed to manage eBooks in libraries. Librarians may purchase new eBooks for the collection, add new eBook distributors and add new users. Users may check-out eBooks, check-in eBooks and write reviews for them.

Currently the ISV sells the entire software package to libraries regardless of how often the library uses it or which features the library actually uses. In order to lower operational costs and attract new customers, the ISV would like to make their software application available in a subscription model that is hosted 'in the cloud' and they want to charge the subscribers on a per-usage basis.

Since the data schema and data operations include the user account details, this ISV wants to allow each library to track the expenses of their individual users. The ISV product manager decides that they want to do the following:

Track each time an eBook is purchased.
Track when a user checks-out an eBook.
Track each week that the user keeps the eBook checked out (since the library can only afford a limited number of each eBook.)
Track when a user submits a review, but only do this once for any given user and eBook.
Track when the user checks-in the eBook.
Track when the library adds a new eBook distributor.
Track when the library adds a new user.

The ISV wants to enable the library to do the following:
Track each time the user checks-out an eBook.
Track each week the user keeps the eBook checked-out (since the library only has a limited number of each eBooks.)
Track when the user submits a review, but only do this once for any given user and eBook.
Track when the user checks-in the eBook.

The ISV has a few more rules which are not in their application today:
They want to track usage of an eBook only after the user has verifiably downloaded the eBook.
They want to continue to track the eBook until that book is verifiably removed from the user's computer.
When ordering eBooks from a distributor, the software application wants to ensure that the bill is not paid until the books have been verifiably received.

The software application can do none of this today. The ISV wants to put their application 'in the cloud' and establish usage-based billing, but they cannot afford (time, money, people, etc.) to rewrite the entire software application to meet these new challenges. The system and methods of the present invention is particularly valuable in this scenario.

First, the software application product manager decides which business activities to meter, how to price them and how to bill for them. Next the software application architects and developers identify the key data store activities which confirm that each business activity has occurred.

1. Business Activities in Library Example

Figure 5:
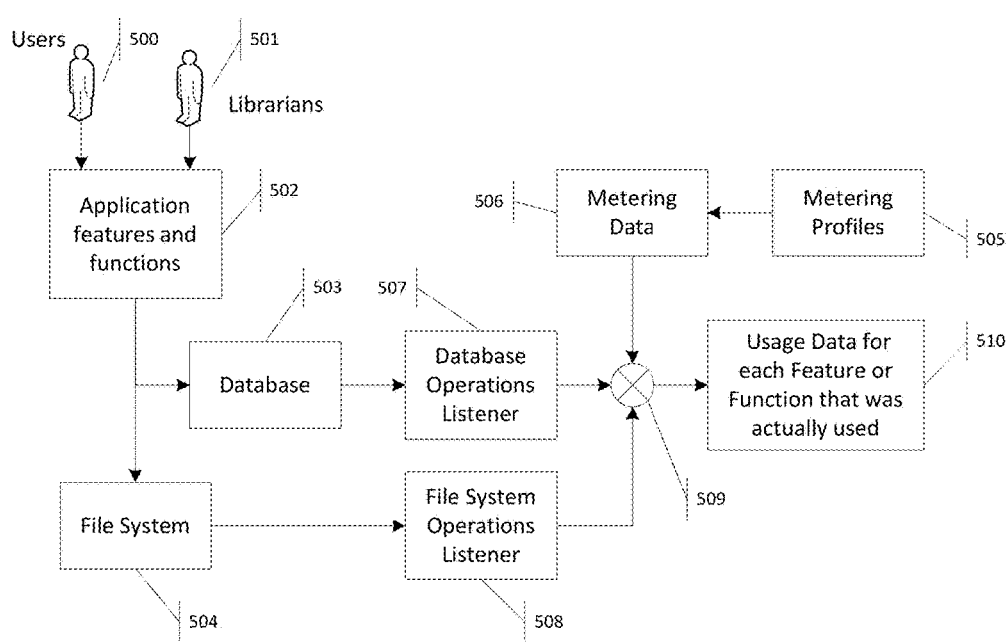
FIG. 5 is a block diagram showing the system and methods hereof in the context of a library application example.

For each metered business activity shown in FIG. 5, the system and method declares that a business activity was performed as soon as it detects that the requisite data store categories and operations criteria have been satisfied for that business activity.

User Checks-Out eBook from Library:
DB: Record successfully inserted into CheckOut table for user X and eBook Y (note this rule fails if the record already exists, suggesting that the user already has this eBook checked-out)
DB: Record successfully updated in AccountReceivables table for user X and eBook Y
DB: Record successfully updated in CheckOut table to show 'downloaded=true' for user X and eBook Y
FS: Files for eBook Y exist in directory Z User Keeps the eBook Checked-Out for One Week:
DB: Record in the CheckOut table shows 'downloaded=true' for user X and eBook Y
Cal: One week has passed since the last time we performed this check User Checks-in eBook to Library:
DB: Record successfully updated in AccountReceivables table for user X and eBook Y (there should be no error if the user attempts to check-in a book which is not already checked-out)
DB: Record successfully updated in CheckOut table to show 'downloaded=false' for user X and eBook Y
FS: Files for eBook Y do not exist in directory Z User Submits Review for eBook:
DB: Record inserted into Reviews table for user Y and eBook Z (note that this fails if the review already exists for this user and eBook)
DB: Record updated in Books table to show 'LatestReview=ThisReview' for eBook Z Librarian Purchases New eBooks:
DB: Record upserted to history table to show 'eBookQuantity>0'
DB: Record upserted to AccountsPayable table for Distributor X
DB: Record updated in Books table where 'received=true' for eBook X
FS: Files for new eBooks exist in directory Z As used herein, "upsert" means to update a record and, if no matching record is found, the data is inserted.

Librarian Adds New eBook Vendor:
DB: Record inserted into Distributor table for new distributor (note that this fails if the distributor already exists in this table)
DB: Record inserted into AccountsPayable table showing 'balanceDue=0' (note that this fails if the distributor already exists in this table)

Librarian Adds New User:
DB: Record inserted into Users table for new user (note that this fails if the user already exists in this table)
DB: Record inserted into AccountsReceivable table showing 'balanceDue=0' (note that this fails if the user already exists in this table)

2. Architecture in Library Example

FIG. 5 illustrates a possible logical architecture for this example. As shown in FIG. 5, once the application is initialized and the accounts are setup, users (500) and librarians (501) log into the application (502). As users and librarians perform their activities, the changes are noticed in the underlying data stores, the database (503) and the file system (504). Key details of these changes are captured as data store operations (507 and 508) for each data store. The metering data (506) in the metering profiles (505) are used to process (509) the incoming data store operations data (507 and 508). The result of this process is the business activity data (510).

3. Metering Profile in Library Example

Figure 6A:
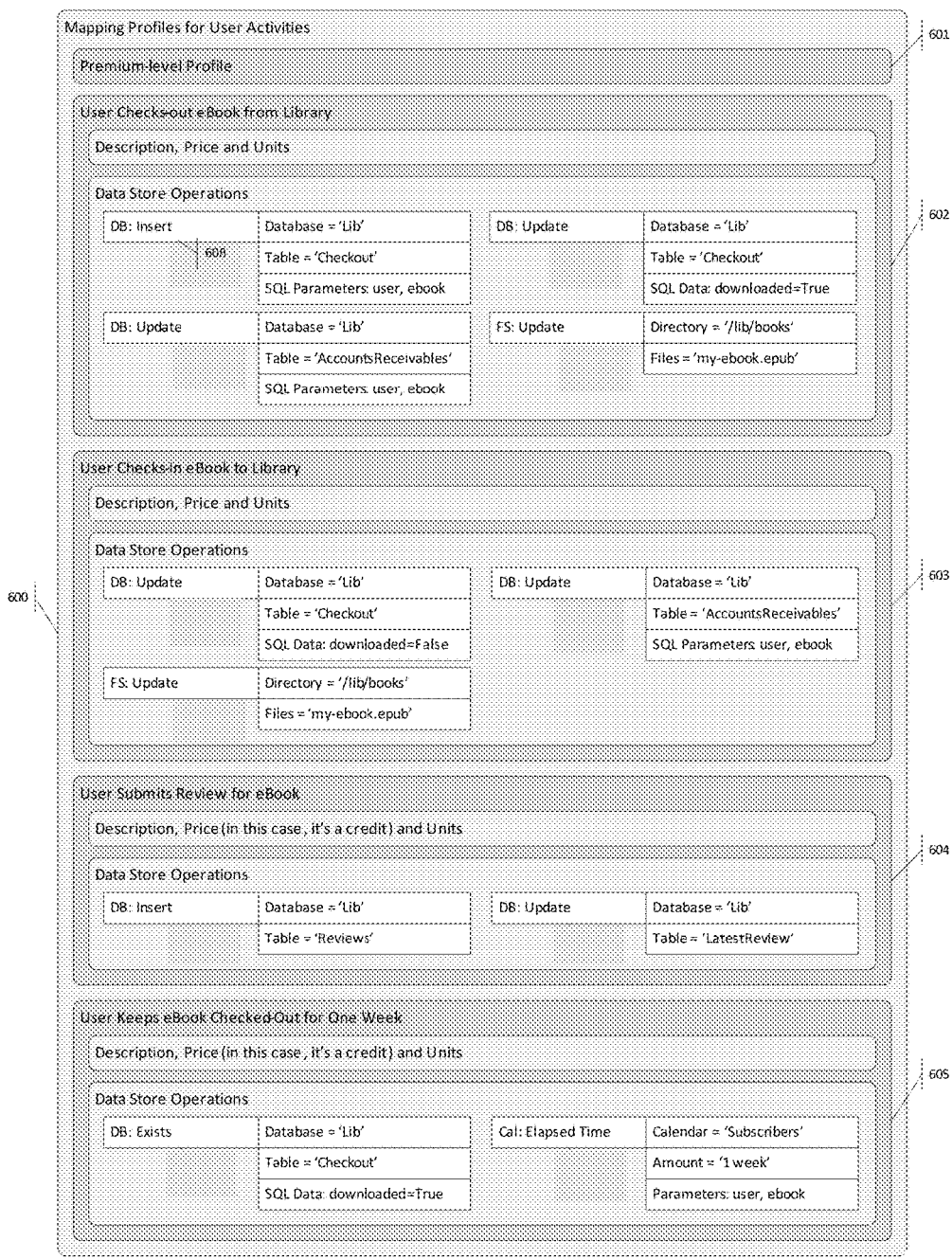
FIGS. 6A and 6B are profiles depicting metering profiles for the library example of FIG. 5.
Figure 6B:
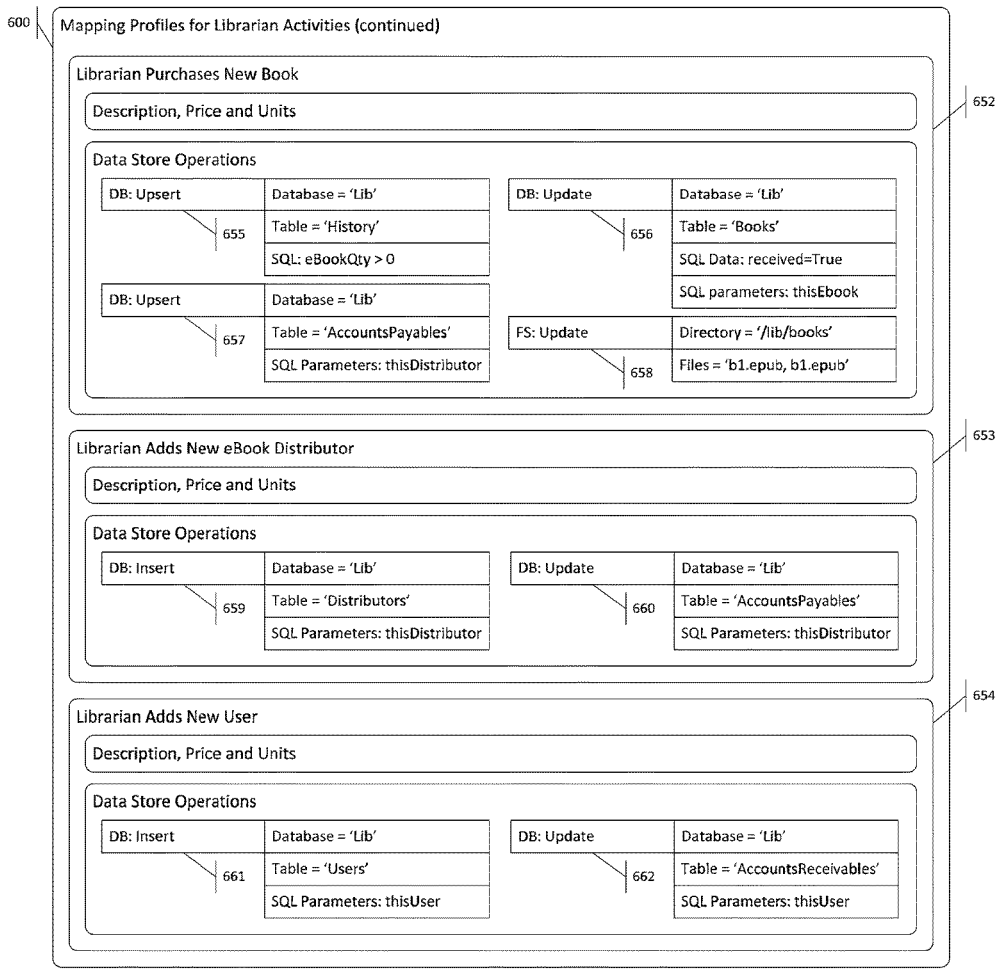

FIGS. 6A and 6B show a sample metering profile which implements the criteria listed above. The diagrams of FIGS. 6A and 6B do not show the prices. In practice, pricing and billing decisions are independent of the effort to provide metering criteria for each business activity being metered.

In this example, the ISV product manager decides which business activities they can meter, how much to charge for them, how to generate statements and how to bill for the services rendered. All of this information is entered into the metering profiles for this product. The metering profiles are then handed to the ISV architects and developers so they can provide the metering data which associates the business activities with the corresponding data store operation definitions.

4. Metering Data in Library Example

The two diagrams (FIG. 6A and FIG. 6B) show a single metering profile (600). The metering profile contains descriptive information (601). Each business activity (602, 603, 604, 605, 652, 653 and 654) is configured with descriptive data along with one or more data store operation definitions.

FIGS. 6A and 6B implement the data store operation definitions [described above]. In the first business activity (602), our example shows the first data store operation definition (608) ensures that an insert has been performed into the table called 'Checkout' in the database called 'lib' using the specified User and eBook IDs. All of the data store operation definitions operate similarly.

5. Usage Reporting in Library Example

The system and methods of the present invention are primarily concerned about business activity usage reporting instead of just pricing and billing. For example, an IT department may only want to know which features are being used, and by whom, so they can justify paying the costs of maintaining that feature. Some ISVs may also want to do this for a few months so they can determine which business activities are the most common and which are the most valuable. Once the ISV has a good idea of actual business activity usage, then they may consider how much to charge for each activity. This comes up again in the section about integrating with advanced analytics If a business activity is defined as three inserts into a specific table of a particular database, then only one business activity will be reported for each three matching inserts into that table.

Naturally, the business activity usage data may be fed directly, or indirectly, into an external billing service. This is discussed in more detail below.

The following business activities are used in this example. The units may be used in a variety of ways. For example, it may define a minimum purchase or it may determine how many events must happen before submitting one usage record.

The following tables show a 1-to-1 relationship between units and business activities. However an alternative might have '3' for the units of the "User Checks-out eBook from Library" business activity. This might indicate that the control center is supposed to report one usage of the "User Checks-out eBook from Library" business activity each time 3 eBooks are checked-out from the library.

For simplicity, the sample application discussed herein has a 1-to-1 relationship between units and business activities. This means units are always set to '1'.

Library Business Activities:

| Business Activity | Units |
|---|---|
| User Checks-out eBook from Library | 1 |
| User Keeps eBook for one week | 1 |
| User Checks-in eBook to Library | 1 |
| User Submits Review for eBook | 1 |
| Librarian Purchases New eBooks | 1 |
| Librarian Adds New eBook Vendor | 1 |
| Librarian Adds New User | 1 |

User Business Activities:

| Business Activity | Units |
|---|---|
| User Checks-out eBook from Library | 1 |
| User Keeps eBook for one week | 1 |
| User Checks-in eBook to Library | 1 |
| User Submits Review for eBook | 1 |

6. Pricing and Billing in Library Example

When certain embodiments of the system and methods of the present invention are used to provide data for billing purposes, prices are assigned to units of business activities. For example, an ISV may charge $5 each time 3 activities are performed. Pricing data may be defined in the external billing service, or it may be defined within the metadata of this invention.

Each product, subscriber, metering profile and business activity is associated with a unique entity in the external billing service. In the control center, each business activity has an ID that is unique to the control center. In the billing service, the same business activity has an ID that's unique to the billing service. These two sets of IDs are mapped to each other so the control center can correctly submit usage records to the billing service. In this case, the control center IDs are replaced with the corresponding billing service IDs. Given the above tables, the following prices are used:

ISV Charges to a Library:

| Business Activity | Units | Price per Unit |
|---|---|---|
| User Checks-out eBook from Library | 1 | $0.05 |
| User Keeps eBook for one week | 1 | $0.05 |
| User Checks-in eBook to Library | 1 | $0.00 |
| User Submits Review for eBook | 1 | ($0.02) |
| Librarian Purchases New eBooks | 1 | $0.05 |
| Librarian Adds New eBook Vendor | 1 | $0.03 |
| Librarian Adds New User | 1 | $0.02 |

Library Charges to a User:

| Business Activity | Units | Price per Unit |
|---|---|---|
| User Checks-out eBook from Library | 1 | $0.20 |
| User Keeps eBook for one week | 1 | $0.10 |
| User Checks-in eBook to Library | 1 | $0.00 |
| User Submits Review for eBook | 1 | ($0.02) |

In the above tables, the quantity is shown as 1. The ISV may elect to offer other rates, such as 1 for $1 and 3 for $2. They may also set a minimum price at $2 regardless of how many items the customer consumed. When processing the usage data into reports, the control center implements the logic dictated by these rate plans. So if the customer buys 5 units they will pay $4 since they are charged $2 for the first three and then charged $1 each for the last two.

Note that these are the charges for using the software application to manage the library's eBook collection. For simplicity, in this example the process of buying the eBooks is handled separately. In a real-world implementation, the procurement and payment mechanisms and activities could be included in the metering profiles. There are two levels of pricing. First is what the ISV charges the library for using the service. Second is what the library charges users for using the eBooks.

Consider this activity:

The library adds thirty new users and two new distributors.

The library places two orders for books from the two distributors

One user checks-out three eBooks, writes one review and returns them after two weeks.

Another user checks-out five eBooks, writes two reviews and returns them after three weeks.

Given this activity, this is a sample statement for a library:

| | |
|---|---|
| Library registers 2 new distributors | $0.05 * 2 = $0.10 |
| Library registers 30 new users | $0.02 * 30 = $0.60 |
| Library places a single order for 12 eBooks from Distributor 1 | $0.05 * 1 = $0.05 |
| Library places a single order for 20 eBooks from Distributor 2 | $0.05 * 1 = $0.05 |
| User X checks-out three eBooks | $0.05 * 3 = $0.15 |
| User X keeps all three books checked out for 2 weeks | $0.05 * 3 * 2 = $0.30 |
| User X submits a review for one eBook | ($0.02) * 1 = ($0.02) |
| User Y checks-out five eBooks | $0.05 * 5 = $0.25 |
| User Y keeps all five books checked out for 3 weeks | $0.05 * 5 * 3 = $0.75 |
| User Y submits are review for two eBooks | ($0.02) * 2 = ($0.04) |
| User X checks-in all three eBooks | $0.00 * 3 = $0.00 |
| User Y checks-in all five eBooks | $0.00 * 5 = $0.00 |
| Balance due to ISV | $2.19 |

The ISV can itemize the statement in a manner that allows the library to pass the appropriate charges to the individual users. Note that the pricing was setup to allow the library to show a profit from the service they provide to users.
This is a sample statement for user X. Note that the library does not include the check-in records in the user statement, but the data is in the control center database if needed.

| | |
|---|---|
| User X checks-out three eBooks | $0.20 * 3 = $0.60 |
| User X keeps all three books checked out for 2 weeks | $0.10 * 3 * 2 = $0.60 |
| User X submits a review for one eBook | ($0.02) * 1 = ($0.02) |
| Balance due to Library | $1.18 |

This is a sample statement for user Y:

| | |
|---|---|
| User Y checks-out five eBooks | $0.20 * 5 = $1.00 |
| User Y keeps all five books checked out for 3 weeks | $0.10 * 5 * 3 = $1.50 |
| User Y submits are review for two eBooks | ($0.02) * 2 = ($0.04) |
| Balance due to Library | $2.46 |

So, the library owes $2.09 to the ISV. User X owes the library $1.18 and User Y owes the library $2.46. This means the library realizes a $1.55 profit from this billing period. Clearly, this is a business model where the ISV and library are planning on capitalize on high volume, not high prices.

However, keep in mind that this section was only intended to show how the usage data may be used to generate statements and billing data. This invention is not focused at all on billing other than providing reliable usage data that may be used for billing, as well as other purposes.

7. Distribution of Processing in Library Example

Some data store operation processing will be performed by the agent. The rest of the data store operation processing will be performed on the control center. The metering data tells the agent which listeners to register. It also tells the listeners which criteria they should use when deciding whether to 'count' an incoming event.

Some data store operation processing can only be performed on the agent, like checking for the existence of a client-side file.

Similarly, some data store operation processing can only be performed on the control center, like checking for the existence of a specific usage record in order to avoid duplications.

The agent may aggregate 'like' events across ISV-defined periods so a single record sent across the network can represent multiple occurrences of the event. This nearly always improves performance, but may increase load on the agent.

If the agent is a weak machine then it is possible to move some of the heavy lifting to the control center. This may increase network traffic and increase load on the control center, but it may be preferable if client-side performance is critical.

Conversely, if the control center is heavily-loaded then it is possible to move some of the heavy lifting back to the agent. This will reduce network traffic as well as reducing load on the control center, both of which will maximize server-side performance, but it may reduce client-side performance.

8. Implementation in the Library Example

Figure 7:
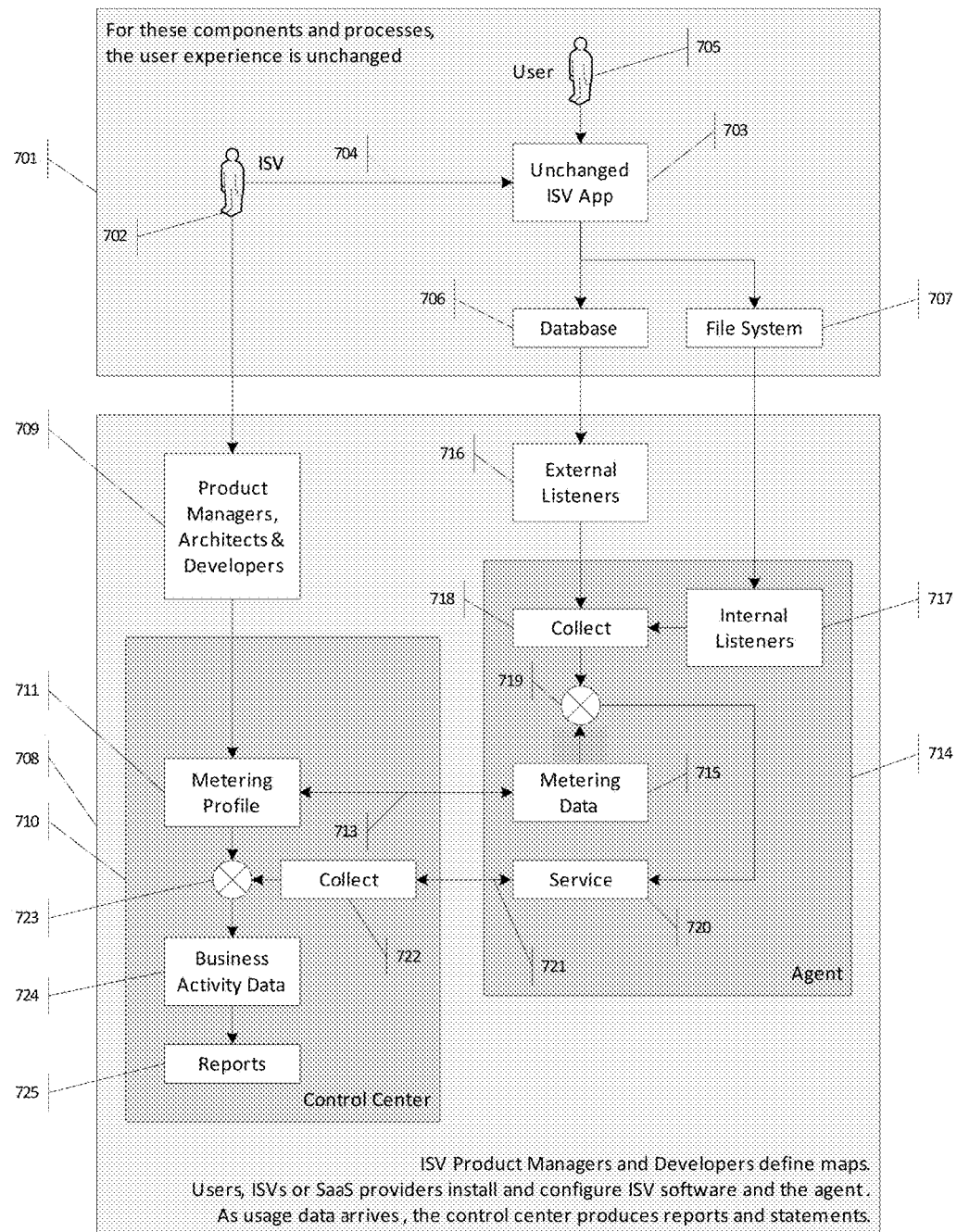
FIG. 7 is a diagram showing one exemplary solution in more detail.

FIG. 7 is a diagram that describes this example solution but with much more detail about the parts and processes provided by this invention.

Note first that the user experience for the components in the top grey block (701) is unchanged. The ISV sells and delivers (704) the software application (703) just like before. The user (705) installs the software application (703) just like before. The software application's (703) installer initializes the database (706) and the file system (707) just like before.

As part of registering for the software application's consumption-based service, the user installs and initializes (e.g., utilizes a web browser to download, install and initialize) the agent (714) along with any of the optional external listeners (716 and 717) specified by the metering data (715) in the metering profiles (711).

There are three main components: the control center, the agents and listeners. The agent installer normally provides the internal and external listeners.

9. Control Center in Library Example

The control center (710) handles these tasks:

Builds metering profiles (711) that map data store operation definitions to business activities Decides which metering data (712) criteria to implement at the agent and which to implement in the control center Sends (713) the metering data (715) to the agent (714) which is used to setup requisite listeners (716 and 717). The control center may push the metering data to the agent or the agent may pull this metering data from the control center.

Collects (722) filtered usage data from the service (720) in the agent (714). The filtered usage data may be pushed to the control center or the control center may pull this data from the agent.

Uses mapping data in the metering profiles (711) to convert (723) the collected filtered usage data (722) into business activity usage data (724)

Generates reports (725) of business activity usage data (724)

Install and initialize the agent (714)

10. Agent

The agent (714) handles these tasks:

Registers the agent service (720)

Downloads (713) the metering data (715) from the control center (710). The metering data (715) may be pushed to the agent (714) or the agent (714) may pull this metering data (715) from the control center (710).

Based on the metering data (715) requirements:

Registers the required agent listeners, both internal (717) and external (716).

Registers the metering data (715) criteria that determines how to filter incoming data store operations data which should be handled by the agent (714).

Collects raw data store operations data (718) from the agent listeners (716 and 717).

Preprocesses (719) the data store operations data (718) by applying the downloaded metering data (715) criteria to filter the incoming data store operations data (718)

Send (721) the filtered usage data (720) back to the control center (710). The filtered usage data (718) may be pushed by the agent (714) to the control center (710) or the control center (710) may pull this data from the agent (714).

A service (720) in the agent (714) makes sure that new metering data (715) is promptly and correctly downloaded (713). It also ensures that filtered usage data (718) is reliably and securely sent (721) to the control center (710)

The agent (714) works closely with and must remain in communication with the control center (710).

When the agent (714) is initialized, the control center (710) sends (713) the appropriate mapping data (712) to the agent (714). At this point, the system is ready to meter the usage of the software application.

As the user utilizes the software application, the agent (714) collects the data store operation data (718) and applies (719) some-to-much of the criteria in the metering data (715). On a regular basis, the agent's service (720) sends (721) this filtered data to the control center (710). The control center (710) can present the filtered usage data (720, 722) and the business activity usage data (724) in a variety of formats (725), for example, as an XML document or a PDF statement sorted by user then further sorted by business activity.

11. Listeners

A listener notices when something changes. Some listeners may need to operate in or near real time speeds. Other listeners may be OK if they only check for changes every few minutes.

External listeners (716) include things like database audit plugins that are installed directly into the data store. It can also include output from 3$^{rd}$ party tools like detailed logs from a SQL Monitor application or web logs from an Apache Web Server.

Internal listeners (717) are part of the agent. They watch things which do not need an external plugin. This may include monitoring for file system changes, event log changes, registry changes.

The metering profile (711) determines which listeners are registered. It also determines the criteria that each listener is looking for.

12. Business Activity Analysis

The data store operations data are collected by the agent and control center in chronological order. When the metering data was downloaded, the agent was informed of what to listen for. This not only decides which listeners to register in the agent, it also tells the listeners which criteria to apply to incoming data store operations data. The agent only keeps, or 'counts', incoming data store operations data that match the criteria in the metering data. The metering data also determines which data is returned to the control center.

When the agent notices that all of the data store operation definitions for a given business activity criteria are satisfied, the agent generates a business activity usage record to send to the control center.

13. Reporting

Business activity usage data is stored in the control center database. This data can be converted into a variety of file formats, like XML, PDF, CSV, etc. The control center also has the ability to emit the output in the native file format for importing into external third party services like billing systems, or analytic systems.

14. Integration with Advanced Analytics

The business activity usage data can be further processed by advanced analytical software. For example, the ISV product managers may use it to predict trends, highlight the especially profitable subscribers, flag the more problematic subscribers and suggest special promotions.

More importantly, many ISVs really do not know how their customers are using their applications. Before pricing discussions can be fruitful, the ISV may want to meter business activities for several months so they can form an accurate picture of which business activities are most common and/or most valuable.

15. Integration with External Billing Services

The control center can submit the usage records directly into an external billing service, like Aria or Zuora, through their web service APIs or other integration entry points. Some external billing services or applications accept usage records in bulk by submitting a suitably formatted XML, CSV file, or other file formats.

This scenario assumes that the ISV and/or the subscriber already have an account with the external billing service. They also have defined products, rate plans, rate charges, subscriptions, invoices, etc. The names of these entities are generally different for each different billing service. Each of these entities has a unique ID. The control center IDs for the business activities and metering profiles are 'mapped' directly to the equivalent IDs for the external billing service.

Once setup, before the data is sent to the external billing service then the control center IDs are replaced with the billing service IDs. Once the usage data is submitted, you can use the billing service to generate and send billing statements.

16. Data Security

Data store operations data and metering data are persisted in the agent within a set of tamper-proof encrypted and locked data files. If the data files appear to be improperly altered, the agent can notify the ISV immediately so the problem can be resolved. Note that automatically resolving billing issues is not a function of this invention.

Raw user data, like SQL queries or file contents, are never transmitted to the control center unless the metering profile requires it. For each criteria in the metering data, a usage record type is specifically defined for this data store operation. This record is populated with key details of the event and may also indicate that multiple occurrences happened since the last collection. It also has many hard-coded cross-references that it acquired from the metering data. It is this record that is sent back to the control center.

In order for this usage record to be of any value to a hacker, the hacker would need to know the schema, contents and indices of the invention's entire metadata.

Metering profile and metering data are encrypted by the control center and sent over a secure HTTPS web service to the agent. Usage records are encrypted by the agent and sent via a web service in the control center that sits behind a secure HTTPS server.

In order for this usage record to be of any value to a hacker, the hacker would need to know the encryption algorithm and seed value. He would also need to know the data structures and interfaces for the web service. And he would need to know the credentials for the HTTPS login.

phpWIMS Demonstration phpWIMS Demonstration is a prototype implemented to show an ISV how an end-to-end solution works. This demonstration is just one example of the system and method of the present invention when integrated with billing functionality.

The UseaBiLLity Quick Start and Deeper Dive 'live' demonstration uses a simple software application, an unchanged phpWIMS distribution, that only uses a relational database as the data store. This is likely to be the most common configuration.

phpWIMS is an open-source software application for managing a personal wine cellar. It uses MySQL for the data store, so in this demo the agent will register one database listener. In this case, it is an external listener that is implemented as a MySQL audit plugin.

Everything shown above applies to this demonstration except that the metering profile is simpler and there is only one listener.

The following is a description of the above architecture and processes, only this time the story is told from the perspective of the users and the ISV.

The demonstration is configured and hosted in an Amazon EC2 instance. The control center and Client are preinstalled and initialized along with phpWIMS and its MySQL database.

Quick Start

In the Quick Start, the demonstration is preconfigured with one metering profile for a non-wholesale subscriber, a merchant called 'Pervasive Vineyards'. It has one business activity definition for 'Submit New Bottle(s)' as shown in FIG. 9A.

The metering data for this business activity is:
 DB: Insert a new record into the 'bottle' table of the 'phpWIMs' database.

This business activity is shown in FIG. 9B. The preconfigured business activity of FIG. 9B is priced at $1.00 per submission.

Note that this is charged each time 'Submit New Bottle(s)' is business activity performed, regardless of whether the submission quantity is for 2 or 20 bottles. It is possible to charge per bottle, but this demonstration happens to charges by submission.

Figures 9C, 9D, 9E, 9F:
Figures 11A, 11B:
Figure 11C:
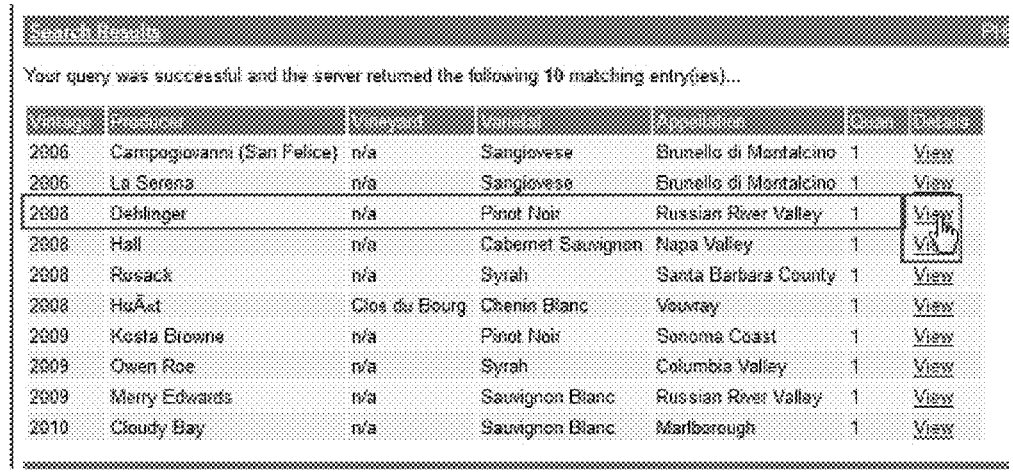
Figure 11D:
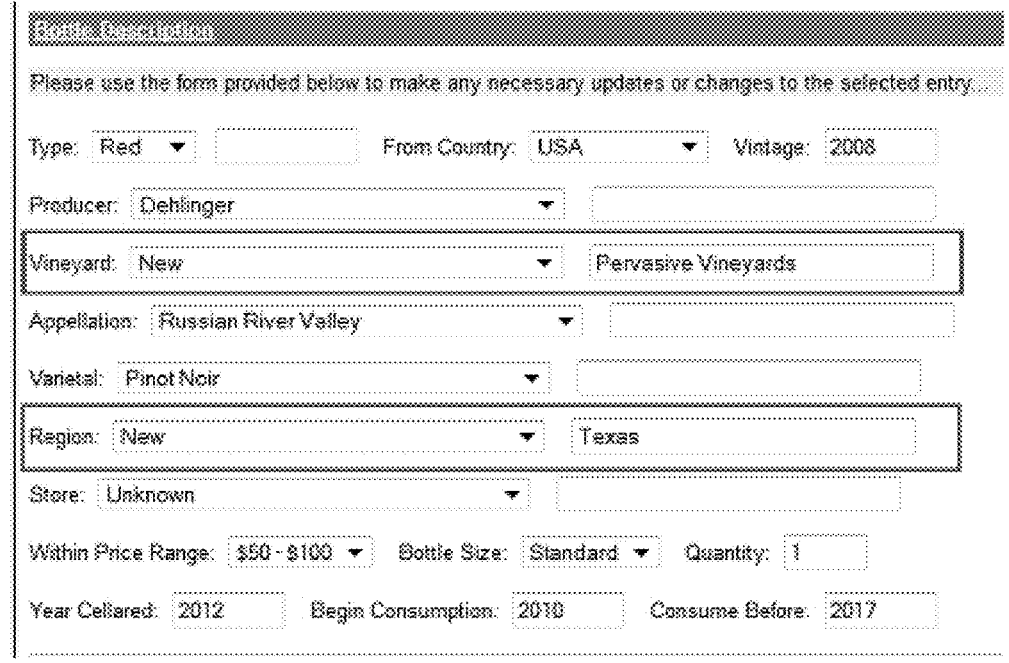

The Quick Start begins by having the subscriber submit a new bottle, shown in FIG. 9C. FIG. 9C shows that the vintage that must be consumed before 2022. Submitting the form of FIG. 9C results in the confirmation shown in FIG. 9D.

The demonstration then switches to the current statement shown in FIG. 9E. The user statement of FIG. 9F shows that $1.00 was charged. FIG. 9F also shows the number of submissions and the price for each submission.

Deeper Dive

In the Deeper Dive, we add another business activity to the existing metering profile and view the statement after performing the business activity. We then create a new metering profile for wholesalers, register a new wholesale subscriber and view the statement after performing the new business activities.

Figures 10A, 10B:
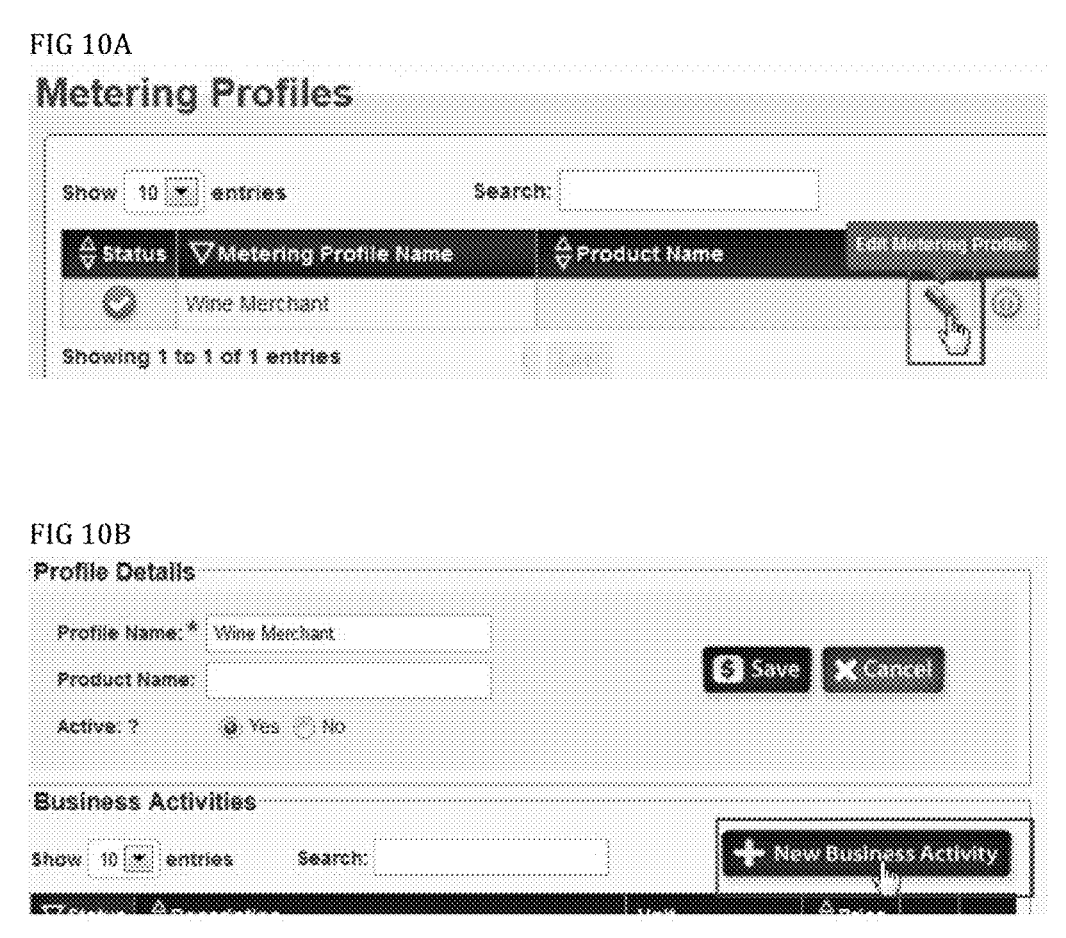

First, as shown in FIG. 10A, we edit the metering profile to add another business activity. Once in the editor, we add another business activity, shown in FIG. 10B. The details of the activity are summarized in FIG. 10C. In this case, the business activity is charging $2 for modifying an existing entry in the bottle table of the phpWIMS database.

Once the metering profile changes are saved, we need to download the new metering data into the agent for this subscriber's data store, as illustrated in FIG. 10D.

In the phpWIMS demonstration, there is a button for downloading the new metering data into the agent. In the illustration of FIG. 10E, this function is performed manually via a button; however, it may also be performed by a timer, in response to a trigger, or in a variety of other ways.

Now the demonstration has you switch roles to the subscriber where we perform the new business activity, shown in FIGS. 11A-11F. In FIGS. 12A-12B, we switch roles to the ISV where we view the statement for this subscriber. Since the user made one $2 change, the total charges for the subscriber in FIG. 12B increases to $3.

Figures 13A, 13B:
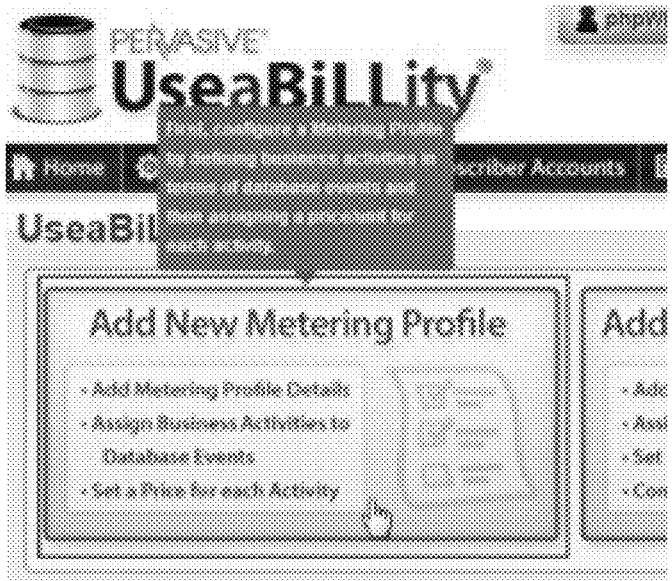
FIGS. 13A-13D relate to another demonstration with a business activity for wholesale dealers, where
Figure 13C:
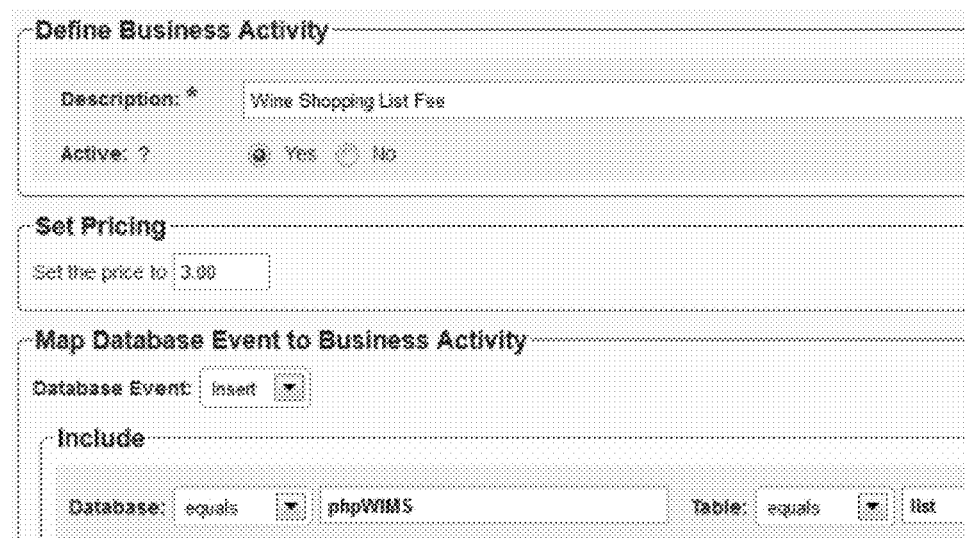

In FIGS. 13A-13B, the demonstration has you create a new metering profile and a business activity for subscribers who are wholesale dealers. FIG. 13C shows the business activity of creating a shopping list and how it relates to the underlying metering data.
 DB: Insert new record into the 'list' table of the 'phpWIMs' database.

Figure 13D:

Now that we have a metering profile for wholesale wine dealers, we will register a new subscription for a wholesale wine dealer, shown in FIG. 13D.

Figures 14A, 14B, 14C:
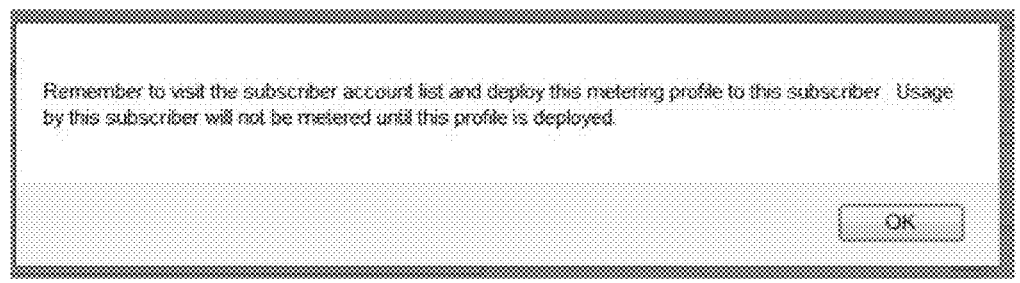
FIGS. 14A-14C relate to the subscriber profile for the example of FIG. 13, where
Figures 15A, 15B:
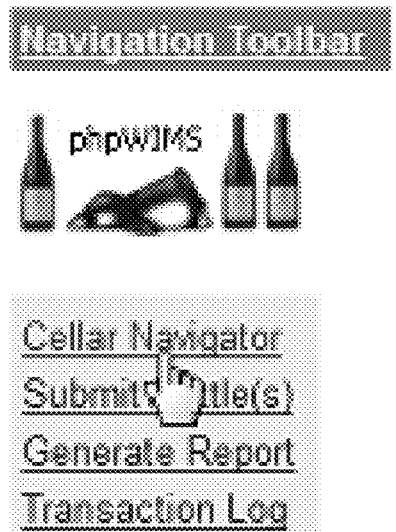

As part of completing the subscriber profile for the wholesale dealer, we need to assign a metering profile to the wholesale subscriber. In this case, we are assigning the wholesale dealer metering profile, shown in FIG. 14A. Once the metering profile changes are complete, we need to download the new metering data to the agent installed for this wholesale subscriber's data store, shown in FIG. 14B. In the demonstration of FIG. 14C, there is a button to cause this to happen. It could also be done on a timer or in response to a trigger.

At this point, we switch roles to the wholesale subscriber and perform the 'create shopping list' business activity, illustrated in FIGS. 15A-15D.

Now that the wholesale subscriber has performed this business activity, we switch roles to the ISV where we will view the statement for this wholesale subscriber, shown in FIG. 16.

Other Samples

The following samples use the same general architecture as above. The only thing that changes is the metering profile and the listeners/criteria required by the software application.

Sample 1
 Business Activity:
 Create and send a PDF of a new invoice using a specific executable.

Listeners:

This sample uses four listeners for the following: File System, Database, Process and Email. As with the previous example, the file system listener is looking for files that have changed and the database listener is looking for changes to the records in certain tables of the database. The process listener confirms that a specific executable is running. The email listener confirms that the invoice was attached to an email and sent to the user.

Metering Profile:

When the following events have been detected by the listeners, the agent or control center asserts that this business activity was performed successfully.

FS: The generated invoice is formatted as a PDF file named Invoice01234.pdf and this file was verified to exist in the 'pendingReply' directory Email: The Invoice01234.pdf PDF file was attached to a standard email and sent to the subscriber's email post office DB: An Upsert was performed into the Invoice table of the Accounting database where userID==thisUserID and invoiceID==thisInvoiceID Proc: The software application's Invoice Generator executable, invgen.exe, was running during the period that the previous events occurred.

When the control center detects that all four of these criteria were satisfied, it increments the counter for the business activity that we called 'Create and send a PDF of a new invoice using a specific executable'.

Sample 2

Business Activity:

Download music from an online music store.

Listeners:

This sample uses three listeners for the following: Web Server, Database and Email. As with the previous example, the database listener is looking for changes to the records in certain tables of the database. The web server listener is looking for a form submission. The email listener is looking to confirm that a specific email was sent to the subscriber.

Metering Profile:

When the following events have been detected by the listeners, the control center asserts that this business activity was performed successfully.

Email: The RedemptionCode.pdf PDF file was attached to a standard email and sent to the subscriber's email post office.

Web: The user submitted the appropriate web form with the redemption code sent by email.

DB: An Update was performed into the Music table of the Media database where userID==thisUserID and redemptionID==thisRedemptionID When the control center detects that all four of these criteria were satisfied, it increments the counter for the business activity that we called 'Download music from an online music store'.

Sample 3

Business Activity:

Upload a Video along with an XML Manifest file.

Listeners:

This sample uses two listeners for the following: File System and Web Server. The file system listener is looking for a certain file with a certain format and content. The web server listener confirms that a download operation was performed successfully for this user.

Metering Profile:

When the following events have been detected by the listeners, the control center asserts that this business activity was performed successfully.

File System: The expected video and XML manifest file was created in the proper folder. The XML manifest file was confirmed to be complete and correct for the uploaded video.

Web: The specified user uploaded the expected MP4 file into the proper folder.

When the control center detects that all four of these criteria were satisfied, it increments the counter for the business activity that we called 'Upload a Video along with an XML Manifest file'.

Sample 4

Business Activity:

Install a new Feature of the software application that includes a service.

Listeners:

This sample uses five listeners for the following: File System, Setup Log, System Log, Registry and Process. The file system listener is looking for the files which the feature depends upon. The Setup Log listener is looking for an event that indicates a successful installation. The System Log listener is looking for an event that indicates a specific service was installed and started properly, and with the correct credentials. The Registry listener is looking for specific keys in the HKEY_SYSTEM hive that confirms proper registration of the feature and services. The Registry Listener is also looking for a valid installed license for this feature. Finally, the Process listener is looking to ensure the proper executables for the feature and service are running with the correct permissions.

Metering Profile:

When the following events have been detected by the listeners, the control center asserts that this business activity was performed successfully.

File System: The feature has a long list of files to check for in a particular directory.

Setup Log: The expected setup event has been detected which proves that the feature was installed successfully.

System Log: The expected system event has been detected which proves that the service was started correctly with the proper credentials.

Registry: The expected name-value pairs exist in the required keys. This includes ensuring that a valid license for the feature was installed in the correct place.

Process: The expected service executable is running with admin-level permissions.

When the control center detects that all four of these criteria were satisfied, it increments the counter for the business activity that we called 'Install a new Feature of the software application that includes a service.'

Terms and Nomenclature

ISV is an acronym for independent software vendor. Note that from here forward, when we discuss an ISV then we could also be discussing an IT department.

The software application and features are what the ISV wants to sell on a consumption basis.

The user, also called the subscriber, is whoever actually uses the ISV's software application. They may have installed the application locally on a physical machine, or may have installed it in a remotely hosted virtual machine, or the ISV may provide a cloud of instances for subscribers to utilize. The data store may be on a different machine than the application. For example, the application may be running in the ISV's cloud but certain data stores, like the main database, may be kept on a physical machine at the subscriber's building.

A metering profile is a collection of metadata that is used to identify and report usage data. A metering profile has a four-level hierarchy:
  Metering Profile
    Business Activities
      Data Store Operation Definitions
        Metering Data A metering profile is composed of business activities where each is associated one or more data store operation definitions. A subset of this data is sent to the agent as metering data. These entities are discussed in more detail below.

For a given application or feature, the ISV may want to define generic metering profiles for silver, gold and platinum customers as well as special metering profiles for wholesale, non-profit or educational customers. In many cases, the business activities might be identical for all of the profiles—only the units and associated prices would be different. For example, high-volume customers might get a better price/unit, but with a higher minimum purchase, than low-volume customers.

However keep in mind that pricing and billing is just one way to utilize this usage data. Some IT departments may have no desire to assign prices or generate bills—they just want to track departmental usage by application, feature or function.

A business activity is a specific usage of a specific feature of a specific software application.

A data store is a repository that stores, manages and retrieves data of any kind.

A data store operation definition describes something that happens to a data store. It could be an insert into a table of a database, a new appointment in a specific calendar, the existence of a specific contact in the company contact list, a certain modification to a specific file in the file system, the existence of a certain key in the registry, etc. It identifies the type of data source to monitor (the category) and what to look for (the criteria). This is covered in more detail below.

The metering data is a portion of the metering profile information that tells the agent which listeners (described below) to register, based on the data store type, and which criteria to use when evaluating data store operation definitions.

The agent is what gets installed on the machine hosting the application's data store. The data store can be hosted locally or remotely from the application. An agent may be installed anywhere a data store that needs to be monitored. It is possible for a data store to span multiple machines where each machine has an agent installed.

Agents may have 'listeners' which monitor for changes to a specific kind of data store. Listeners may be specific to a particular product from a specific vendor (like a MySQL audit plugin), or agents may be generic enough to cover lots of similar data stores (like one of the many Windows system event logs).

The control center is the centralized 'back-end' of the system and is used by the ISV. It contains the web server and metadata that manages subscribers and agents, metering profiles and usage statements. It also has connectors for interacting with external third party services such as services for analytics and billing. Finally, it has web service connections which allow the agent to download metering data and to upload usage data.

When describing a data operation definition, the following nomenclature is used:
  Data Store: Criteria
The Data Store is the name of a type of data store and the Criteria is a test which can be performed against that data store. Each data store type may have a variety of different ways to construct criteria. For example, a typical relational database has row-level operations, table-level operations, database-level operations, stored procedures, prepared statements, user-defined functions and so forth.

There are many types of data stores in the following examples: 'FS' means file system, 'Reg' means registry, 'DB' means database, 'Web' means web server/service, 'Email' means an email server, 'Cal' means a company calendar and 'Proc' means the process list. Note that these are only examples. Many other types of data store also exist. Here are some examples:
  FS: File X exists in Directory Y and is at least Z bytes in size
  FS: XML File X exists with Element Y that contains attribute Z=12
  FS: INI File X exists with Stanza X that contains value Z=12
  FS: PDF exists with ISBN="1234567890"
  Reg: String X exists with value of '0' in Key Y under Hive Z
  Reg: Key X does not exist under Hive Z
  Cal: One week has passed since a previous event occurred
  Cal: One year has passed since the subscription was registered
  DB: Record X is inserted into table Y of database Z where user=A
  DB: Stored Procedure is invoked with parameter Z=True
  Web: Video X is downloaded
  Web: Purchase Order Form X is submitted by user Y
  Web: SOAP request X was received from user Y
  Email: Email X is sent to user Y and receipt X is received
  Proc: Executable X is running with a specific digital certificate
  Proc: Service X is installed and running with a specific digital certificate Multiple operations may be involved in a complex business activity. An ISV may need to be careful about which rules to utilize because some rules are more expensive than others in terms of CPU/RAM/Disk utilization.

A 'data store' is a repository that stores, manages and retrieves data of any kind. The traditional database is the best known type of data store, but there are any others. Here are a few examples that demonstrate the wide variety of data store categories and vendors available today.
  Relational Database—PervasiveSQL, MySQL and PostgreSQL.
  Transactional Database—ISAM and Btrieve.
  Network and Graph Database—Honeywell IDS and TurboImage.
  Object-Oriented Database—Cache, ConceptBase and Zope.
  Embedded Database—Pervasive SQL and Interbase.
  In-memory Database—Terracotta and Altibase.
  Schema-less Database—CouchDB and MongoDB.
  Files and Directories, whether structured or unstructured—Web server log files, spreadsheets, XML/JSON files, web browser cookies, INI files, CSV files and PDF files.
  Configuration Registries—Windows Registry.
  Non-traditional Repositories—Includes the following and more:
    System event logs
    Calendars Contact lists
Process lists
Service lists
Email server logs
Instant message server logs
News server logs
Document servers
Image servers
Video servers
Wiki servers Important:

A key feature of the system and methods of the present invention is that the software application does not have to be changed. A user can add the system and methods of the present invention to any existing software application that interacts with external data stores in order to meter individual features, operations and components of the software application.

Every computer has lots of data stores, as listed above. Every non-trivial software application accesses data stores for many reasons and these operations inevitably result in changes to the data store.

If the software application already stores data on a per-user basis, then this invention can also generate accurate multitenant metering, even if the software was not already multitenant. By 'multitenant' we mean that multiple different users may utilize the same unchanged software application and each user will only be billed for the features, operations and components that they actually use.

For each data store that a software application uses, operations and entities may be monitored for changes. This may be 'active,' such as when we install an audit plugin directly into a database engine that examines every statement as it is processed or when we register an OS-level listener for 'file changed' notifications. It may also be 'passive,' such as when we need to periodically scan for changes to specific registry settings or scan the network ports for the existence of a specific connection.

A given software application activity may involve operations to several data stores that can be individually tracked. For example, an operation may create certain files, insert specific records into a specific table, require a receipt from a specific email, make specific changes to the Windows registry and insert specific records into several specific system logs. When all of these events have happened, it can be said that the tracked operation was used successfully. This usage data is gathered, stored, filtered and reported.

When we use the control center to associate business activities with data store operation definitions, we call the result a metering profile. A metering profile may contain many business activities. For each business activity, there may be multiple data store operation definitions. These data store operation definitions can be lumped into groups, like database, registry, file system, etc.

What is claimed:

1. A method for providing usage data for a software application, feature, or function (AFF) based on data store activities, comprising:
   running said software application, feature, or function (AFF) on a host computer producing one or more data store activities on said computer, the one or more data store activities comprising an operation on data in a data store, where a data store activity does not consist of a quantity of data read or written to a file, the number of reads/writes to a file, or the amount of memory space a file consumes;
   monitoring said plurality of data store activities associated with running said AFF on said host computer;
   cross-referencing said plurality of data store activities against data consumption based on business activity from running said AFF on said computer host;
   producing AFF usage data based upon said cross-referencing; and
   metering business activities based on said AFF usage data.

2. The method of claim 1, said monitoring step using one or more of the following: a plug-in agent embedded in the data store; a listener to said one or more data store activities; external tools monitoring said data store; any files, including log files, produced by the data store; or, user defined functions.

3. The method of claim 1, including the step of creating one or more metering profiles that associates a business activity with data store operations.

4. The method of claim 1, wherein with said steps of running said AFF and monitoring said data store activities, one step occurs remotely and the other step occurs locally.

5. The method of claim 1, wherein said usage data is used to produce an AFF usage statement.

6. The method of claim 1, wherein said usage data is stored in one or more of the following formats: plain, encrypted, or compressed.

7. The method of claim 1, wherein said data store comprises a repository that stores and manages data comprising one or more of: Relational Database, Transactional Database, Network and Graph Database, Object-Oriented Database, Embedded Database, In-memory Database, Schema-less Database, Files and Directories, whether structured or unstructured, Configuration Registries, or Non-traditional Repositories.

8. The method of claim 1, wherein said data store comprises a non-traditional repository being one or more of: System event logs, Calendars, Contact lists, Process lists, Service lists, Email server logs, Instant message server logs, News server logs, Document servers, Image servers, Video servers, or Wiki servers.

9. The method of claim 1, wherein said host computer running said AFF includes a local computer and a remote computer connected by a network.

10. The method of claim 1, said metering includes billing for said business activity based on said data store activities.

11. The method of claim 1, wherein the data store comprises one or more of the following: Relational Database, Transactional Database, Network and Graph Database, Object-Oriented Database, Embedded Database, In-memory Database, Schema-less Database, structured or unstructured Files and Directories, Configuration Registries, Non-traditional Repositories.

12. A system for metering use of a software application feature or function (AFF) comprising:
   a software application, feature or function (AFF) running on a host computer system;
   a data store activity running on a repository of said host computer system, where a data store activity comprises an operation on data in a data store,
      where a data store activity does not consist of a quantity of data read or written to a file, the number of reads/writes to a file, or the amount of memory space a file consumes:
   an agent monitoring said data store activity;
   a metering profile coupled to said agent to associate said data store activity with a business application activities to produce AFP usage data connected with said AFF; and billing for use of said business application activities based, at least in part, on said AFF usage data.

13. The system of claim 12, wherein the host and repository are same computer system.

14. The system of claim 12, wherein the one computer system is local and the other computer system is located remotely.

15. The system of claim 12, said data store comprising a relational database.

16. The system of claim 12, said host and repository computer systems being remote from the user and accessed in a cloud environment.

17. The system of claim 12, wherein a plurality of business activities associated with said AFF are monitored by said agent and are used, at least in part, to produce said usage data.

18. A method for metering business activities performed using a software application, feature or function (AFF), comprising:
   creating a metering profile for the business activity;
   running said AFF performing said business activity on a host computer;
   capturing data store operation information associated with running said AFF where data store operation information comprises an operation on data in a data store, where a data store activity does not consist of a quantity of data read/writes to a file, the number of reads/writes to a file, or the amount of memory space a file consumes;
   cross-referencing said data store operation information against said metering profile to produce AFF usage data reflecting business activities performed using said AFF; and
   billing for said business activities based, at least in part, on said AFP usage data.

19. The method of claim 18, said data store comprising a database and said capturing step utilizing an agent embedded in said datastore.

20. The method of claim 18, said metering profile including a plurality of pricing models based on one or more factors including identity, time, volume, or specific data store operations.

21. The method of claim 18, said metering profile including a plurality of profiles reflecting different customer profiles or usage scenarios.

22. The method of claim 18, wherein said host computer running said AFF includes a local computer and a remote computer connected by a network.

* * * * *

UNITED STATES PATENT AND TRADEMARK OFFICE
CERTIFICATE OF CORRECTION

PATENT NO. : 10,026,069 B2  
APPLICATION NO. : 14/136508  
DATED : July 17, 2018  
INVENTOR(S) : Gilbert Van Cutsem et al.

Page 1 of 1

It is certified that error appears in the above-identified patent and that said Letters Patent is hereby corrected as shown below:

In Claim 12, Column 22, Line 66, delete "AFP" and insert --AFF--

In Claim 18, Column 24, Line 10, delete "AFP" and insert --AFF--

Signed and Sealed this  
Twenty-eighth Day of August, 2018

Andrei Iancu  
*Director of the United States Patent and Trademark Office*